Figure 1:
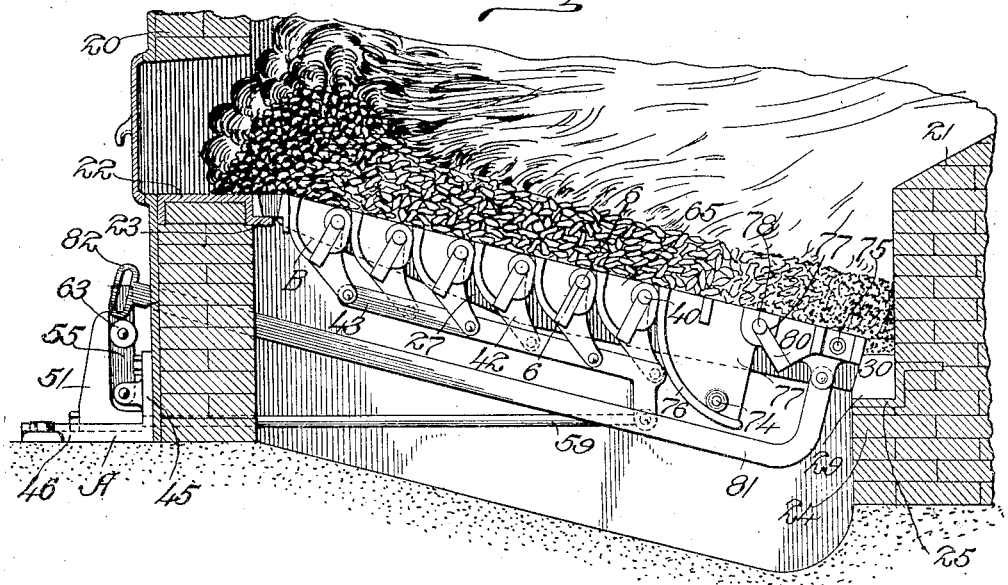

J. E. REESE.
STOKER.
APPLICATION FILED JUNE 28, 1920.

1,403,868.

Patented Jan. 17, 1922.
4 SHEETS—SHEET 1.

Inventor
John E. Reese,
By Henry L. Bright
Attorney

J. E. REESE.
STOKER.
APPLICATION FILED JUNE 28, 1920.

1,403,868.

Patented Jan. 17, 1922.
4 SHEETS—SHEET 2.

Inventor
John E. Reese,
By Henry T. Bright
Attorney

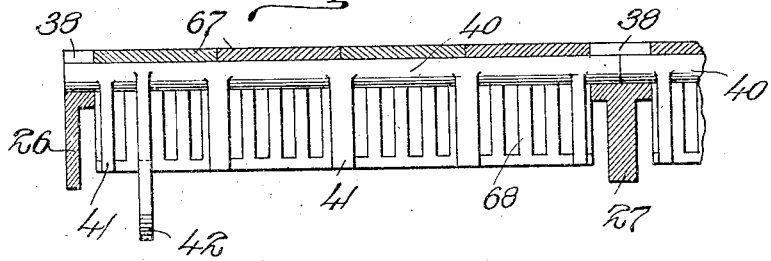
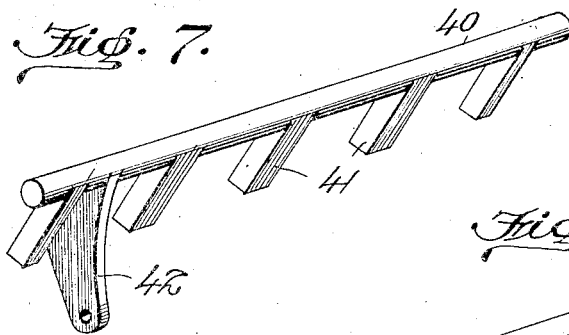
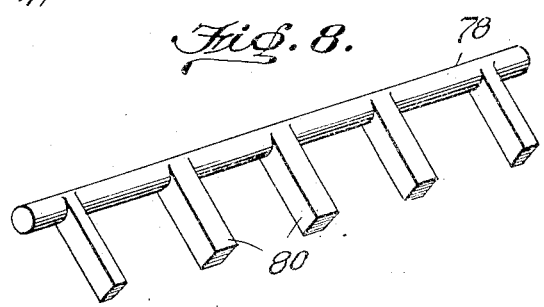
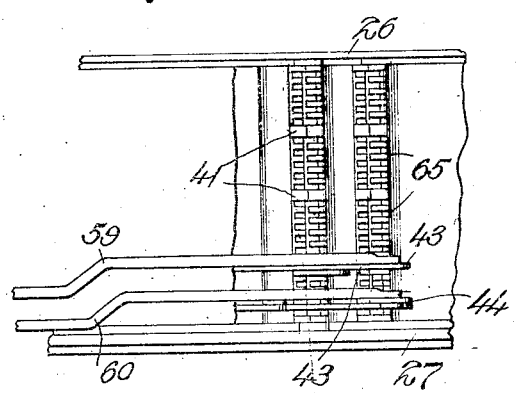
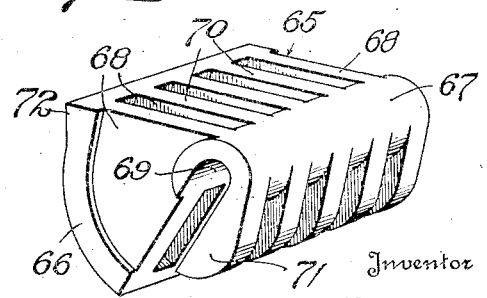

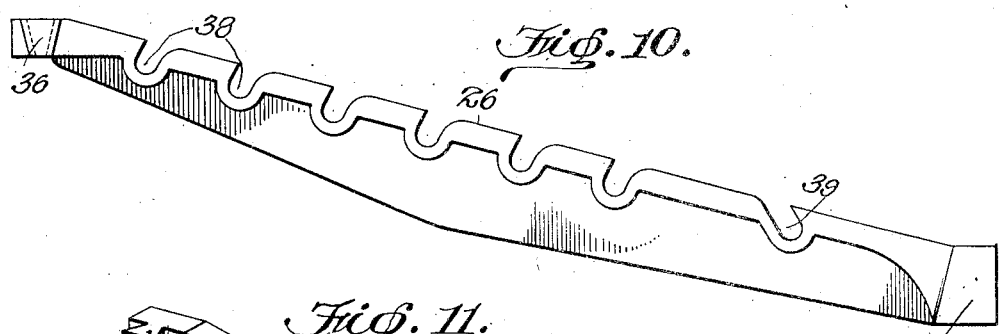
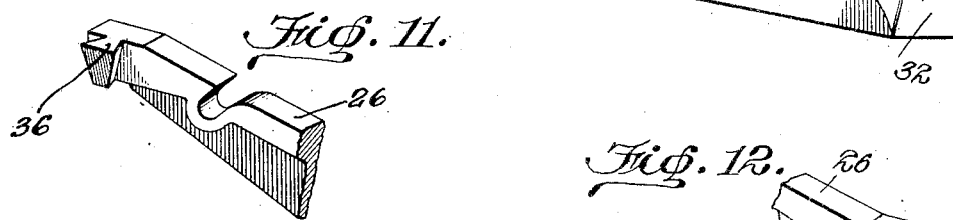
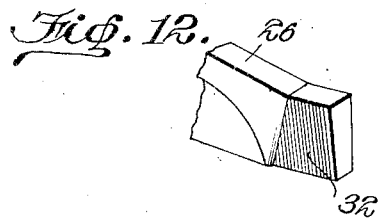
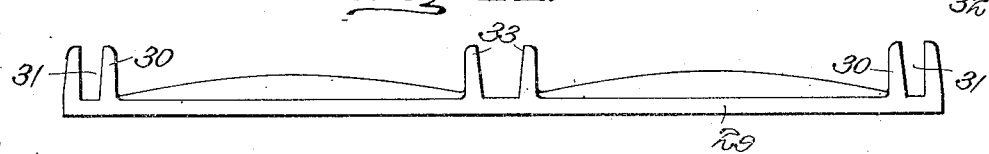
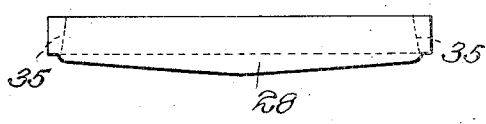
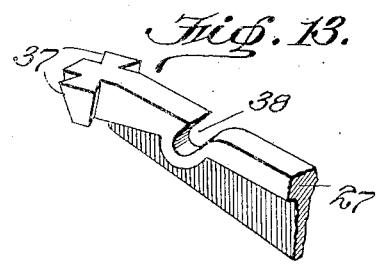

UNITED STATES PATENT OFFICE.

JOHN EDWARD REESE, OF LOUISVILLE, KENTUCKY.

STOKER.

1,403,868.  Specification of Letters Patent.  Patented Jan. 17, 1922.

Application filed June 28, 1920. Serial No. 392,351.

*To all whom it may concern:*

Be it known that I, JOHN E. REESE, a citizen of the United States, and resident of Louisville, in the county of Jefferson and State of Kentucky, have invented certain new and useful Improvements in Stokers, of which the following is a specification.

My invention relates to improvements in stokers of the general type in which combustion takes place upon an inclined grate made up of a plurality of transverse stoker or grate bars, with a cleaning or dumping plate at the lower end of the incline. In stokers of this general type the stoker bars are usually arranged to form two series of connected bars by attaching alternate bars throughout the length of the grate to actuating mechanism whereby each series of bars may be oscillated independently of the other series to advance the fuel toward the dump or cleaning plate. The stoker bars in this type of stokers, have heretofore been supported for oscillation on the grate frame side bars through the medium of trunnions formed integral with the stoker bars, and in addition the mechanism for effecting oscillation of the stoker bars has been connected directly to said bars thereby rendering it necessary in the event of damage to a stoker bar from any cause to first detach the oscillating mechanism, remove the damaged bar, set the new bar, and finally connect the oscillating mechanism to the new bar. Such operation in effecting replacement of damaged stoker bars is difficult, time consuming and expensive.

My present invention therefore contemplates the provision of an improved construction wherein each stoker bar is made separate from and removably supported by a trunnion bar for oscillation with the latter; the mechanism for oscillating the stoker bars being attached to the trunnion bars so that in the event of injury to a stoker bar the latter can be removed and a new bar set in place without disconnecting any of the parts of the stoker. Furthermore, I again reduce the expense incident to the replacement of a stoker bar by constructing each of said bars of a plurality of unconnected sections so that injury to any section necessitates only the removal and replacement of that particular section.

My invention further resides in so shaping and assembling the stoker bars and dump plate on the trunnion bars that each stoker bar except the innermost one is locked against displacement with respect to its related trunnion bar by an adjacent stoker bar, while the innermost stoker bar is locked against such displacement by the dump plate and the latter correspondingly locked by the innermost stoker bar.

It is also the aim of my invention to provide an improved construction of stoker supporting frame wherein the elements of the frame are detachably interlocked in such manner that the weight of the stoker serves to intensify the interlock between the elements of the frame and thereby prevent in a positive and efficient manner any tendency of the deadplate elements of the frame to rise with respect to the other elements or any tendency of the side bar elements to move outwardly and permit the trunnion bars supported thereby to drop down.

I will describe my invention in the best form known to me at present and as applied to a hand stoker, but it will be obvious that features thereof may be applied to mechanical stokers and that the same is susceptible to changes in forms and proportions and to desirable additions with the exercise of only ordinary mechanical skill and without departing from the scope of my invention.

In describing my invention in detail reference will be had to the accompanying drawings wherein like characters of reference denote corresponding parts in the several views, and in which—

Figure 2:
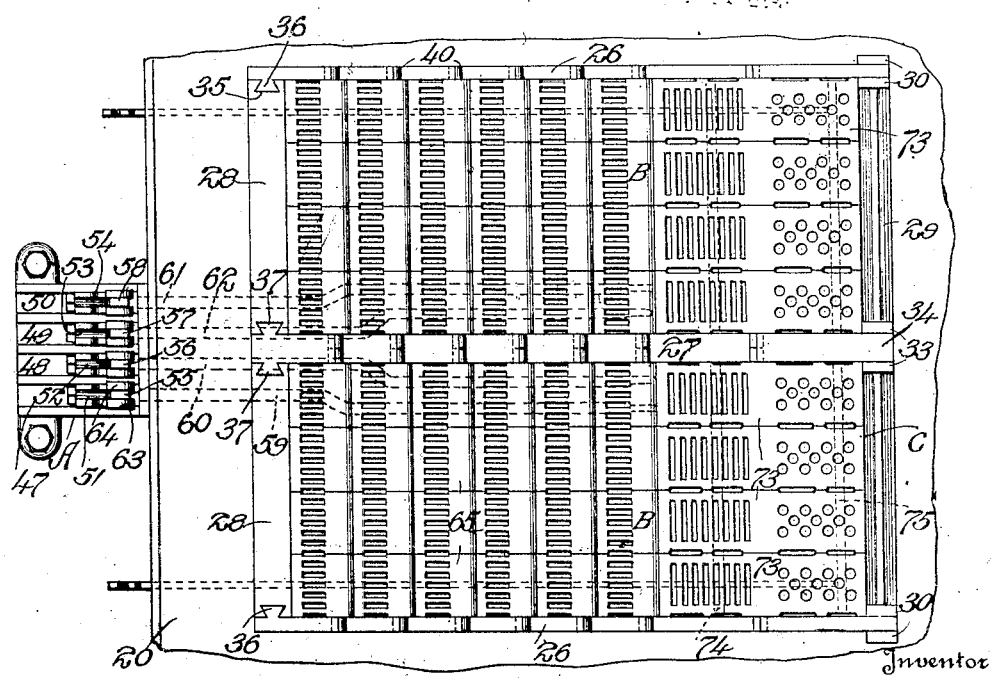
Figure 3:
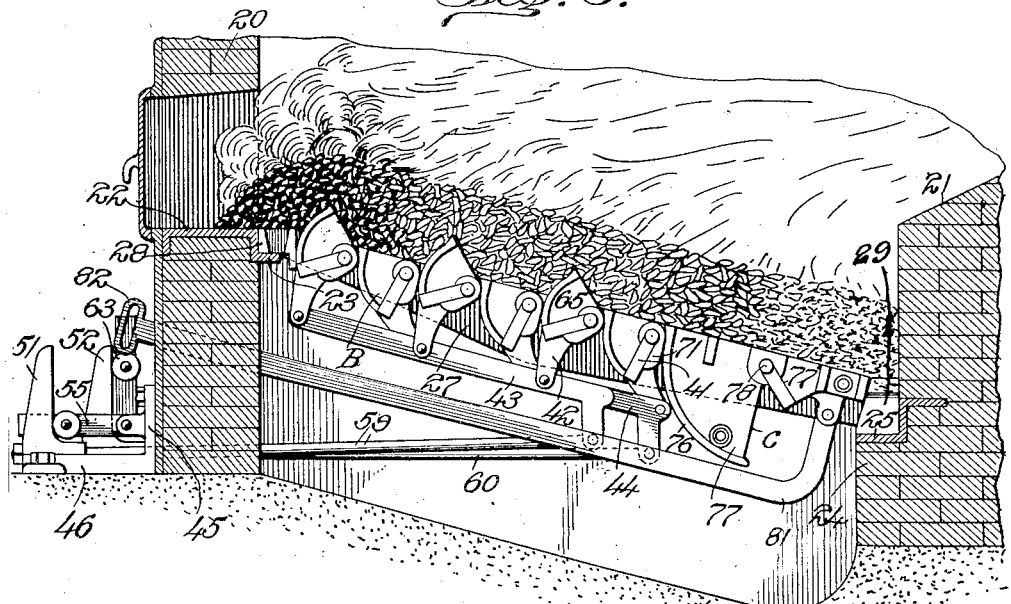
Figure 4:
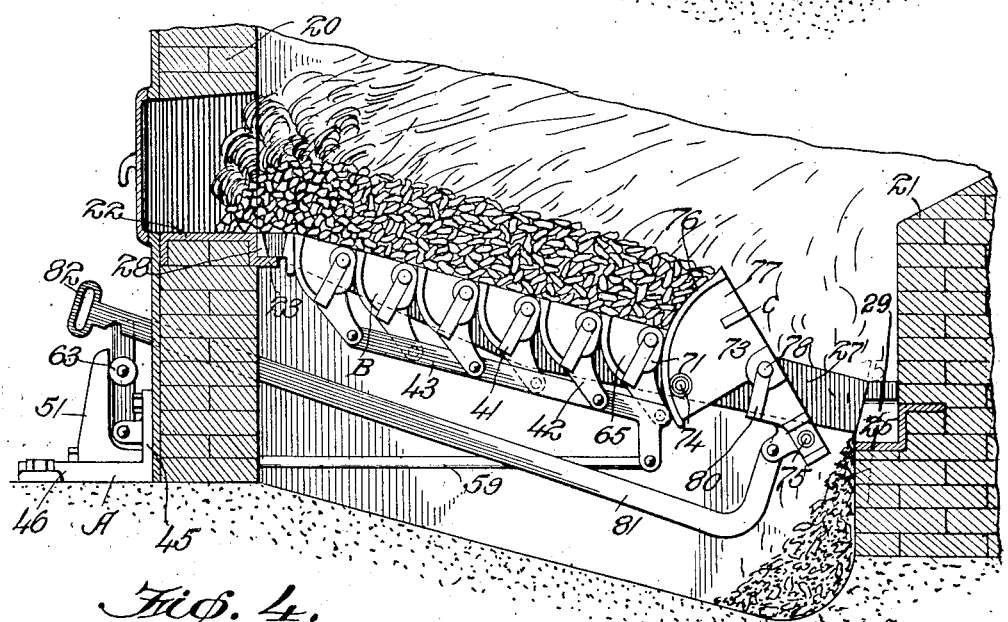

Fig. 1 is a vertical section through a furnace showing in side elevation a stoker embodying my invention, the near side bar of the stoker frame being removed to more clearly disclose the operative relation of the stoker parts;

Fig. 2, a plan view of my improved stoker;

Fig. 3, a view similar to Fig. 1 showing one series of stoker bars oscillated to extreme fuel advancing position;

Fig. 4, a view similar to Fig. 1 showing the dumping or cleaning plate operated to an intermediate position;

Fig. 5, a bottom view of a fragment of my stoker;

Fig. 6, a section on the line 6—6 of Fig. 1;

Fig. 7, a detail perspective view of one of the trunnion bars by which the stoker bars are removably supported;

Fig. 8, a detail perspective view of the trunnion bar associated with the dumping plate;

Fig. 9, a detail perspective view of one of the sections of a stoker bar;

Fig. 10, a side elevation of one of the supporting frame side bars;

Fig. 11, a perspective view of the upper end of the side bar shown in Fig. 10;

Fig. 12, a perspective view of the lower or inner end of the side bar shown in Fig. 10;

Fig. 13, a perspective view of the upper end of the center bar of the supporting frame;

Fig. 14 is a view in elevation of the rear bearing plate of the supporting frame;

Fig. 15, a view in elevation of one of the dead plates of the supporting frame, and Fig. 16, a perspective view of one of the socketed ends of a dead plate.

Referring to the drawings 20 indicates the front wall of the furnace and 21 the bridge wall thereof. The fire door opening of the furnace is provided with the usual firing plate 22 having a lip 23. The bridge wall 21 is provided with a ledge 24 the supporting surface of which is protected by a plate 25 suitably anchored in the bridge wall and resting upon the lip 23 and plate 25 are the upper and lower ends respectively of the supporting frame of my improved stoker. This frame includes side bars 26, a center bar 27, dead plates 28, and a rear bearing plate 29. It will be noted that the plate 25 and lip 23 are located at such relative heights as to dispose the supporting frame in proper downward inclination to the rear of the furnace. The rear bearing plate 29 is seated on the plate 25 and is provided at its ends with upward extensions 30 having downwardly converging recesses 31 therein which receive respectively corresponding tapered lower ends 32 of the side bars 26. The bearing plate 29 is also provided with a centrally disposed upward extension 33 having a downwardly converging recess which receives the correspondingly shaped lower end 34 of the center bar 27. The dead plates 28 rest upon the lip 23 and are provided at each end with downwardly converging dovetail grooves 35 which receive respectively corresponding dove-tail ribs 36 formed on the inner sides of the side bars 26 at the upper ends of the latter and corresponding dove-tail ribs 37 formed on respective sides of the center bar 27. From the foregoing construction it will be apparent that the elements of the supporting frame are detachably interlocked in such manner that the weight of the stoker structure and sustained fuel serves to intensify the interlock between the elements of the frame and prevents any tendency of the dead plates to rise with respect to the other elements of the frame or any tendency of the side bar elements to move outwardly and permit parts supported thereby to drop down.

The upper edge portions of the side bars 26 and center bar 27 are provided respectively with correspondingly positioned and shaped trunnion bar receiving recesses 38 which are diagonally disposed with respect to the plane of the supporting frame and extend upwardly in inclination from the front toward the rear on the furnace. The bars 26 and 27 are also provided adjacent their lower ends with trunnion bar receiving recesses 39 respectively which are disposed diagonally to the plane of the supporting frame but extend oppositely to the recesses 38 or in other words in upward inclination from the bridge wall toward the front wall of the furnace. It will be observed that the supporting frame previously described is designed for a two gate unit stoker, one unit on each side of the center bar 27. However, it will be obvious that the width of the frame may be extended to support as many grate units as are desired.

Each grate unit supported by the frame consists of a plurality of trunnion bars 40 having their ends rotatably seated in corresponding recesses 38 of the side and center bars whereby the bars may be oscillated in series in a manner to be presently described. Each trunnion bar 40 is provided with five radial arms 41 all disposed in the same radial plane and in addition each trunnion bar is provided with a link attaching ear 42 so disposed that the ears of alternate bars are in the same vertical plane while the ears of adjacent bars are in staggered relation. The ears 42 of one series of trunnion bars of each unit of the stoker are connected by a link 43, while the ears 42 of the other series are connected by a link 44. It will thus be seen that by moving the link 43 longitudinally corresponding pivotal movement will be imparted to one series of trunnion bars while similar movement of the link 44 will impart corresponding pivotal movement to the other series of trunnion bars.

The mechanism for effecting the longitudinal movements of the links 43 and 44 comprises an L-shaped plate A disposed exteriorly of the furnace and including a vertical arm 45 and a horizontal arm 46, the latter being anchored to a suitable foundation and the former disposed against the furnace front. The upper face of the arm 46 is provided with grooves 47, 48, 49 and 50 in which are slidably mounted the lower ends of relatively short standards 51, 52, 53 and 54 respectively. Each of these standards is forked to form arms between which operating levers 55, 56, 57 and 58 pivoted to the arm 45 are adapted to respectively swing when said levers are operated from vertical to horizontal position through the medium of a detachable handle applicable selectively to any of said levers. The standards 51 and 52 are connected to the links 43 and 44 of one grate unit by connecting rods 59 and 60 respectively which are slidably engaged through the front wall of the furnace, while the standards 53 and 54 are connected to the links 43 and 44 of the other grate unit by connecting rods 61 and 62. In order to move the standard 51 from the position shown in Fig. 4 to the position shown in Fig. 3 I mount on the sides of the lever 57 rollers 63 and 64 so positioned that when the lever is swung from vertical to horizontal position said rollers will engage the inner edges of the arms of the standard and the cam action resulting will slide the standard 51 outwardly in the slot 47, which movement of the standard will impart one of the pivotal movements to a series of trunnion bars of one grate unit through the medium of connections previously described. When the lever 55 is returned to vertical position the weight of the trunnion bars and the parts supported thereby will operate to impart the other pivotal movement to the trunnion bars and this movement of said bars will of course act through the various connections to return the standard 51 to normal position. The oscillation of the remaining series of trunnion bars in both grate units is accomplished by similar operation of the levers 56, 57 and 58 which latter are also provided respectively with rollers 63 and 64.

My invention further embodies a plurality of stoker bars B each removably supported by a related trunnion bar for oscillation therewith. The detachable relation between the stoker bars B and trunnion bars 40 is a very important feature of my invention as it enables a damaged stoker bar to be replaced by a new bar without disturbing the trunnion bars or disconnecting any of the operating mechanism. This advantage is further enhanced by constructing each stoker bar of a plurality of similar unconnected sections 65 each removable from its related trunnion bar independently of any of the remaining sections so that a relatively small expense is incurred by the damage and replacement of any stoker bar section. In this particular instance I show each stoker bar formed of four sections 65, but I desire it clearly understood that as far as the basic advantage of my invention is concerned, namely the ready removal and application of a stoker bar from and to its related trunnion bar without disconnecting any of the other parts of the stoker, it is immaterial how many sections form each stoker bar or whether the stoker bar is formed as a single element. Each stoker bar section 65 embodies an integral structure formed of a curved shield 66 and a trunnion bearing hub 67 parallel to the shield and disposed substantially coaxial with the latter. This bearing hub 67 is connected to the shield portion by grate bars 68 and the latter are provided with a trunnion bar receiving groove 69 extending across the grate bar and into the bearing hub as clearly shown in Fig. 9. The construction of the combined stoker and grate bar sections as previously described is such as to provide each bar with a fuel supporting surface 70. Upon inspection of Fig. 1 of the drawings it will be observed that normally the arms 41 of the trunnion bars 40 have a predetermined inclination to the plane of the supporting frame corresponding substantially to the inclination of the recesses 38 and it will be further observed that the positioning of the groove 69 in each combined stoker and grate bar section is such that when the stoker and grate bars are engaged on the trunnion bars as shown in Fig. 1 the combined surfaces 70 of the stoker and grate bars constitute a continuous fuel supporting surface substantially parallel to the plane of the supporting frame. When the combined stoker and grate bars are each made up of four sections as herein illustrated each stoker bar supporting trunnion bar is provided with five arms 41 and these arms are so spaced that the intermediate arms will be overlapped by adjacent sections 65 and as a result of the contact between the arms 41 and the walls of the grooves 69 it will be obvious that oscillation of the trunnion bars 41 in the manner heretofore described will produce corresponding oscillation of the combined stoker and grate bars.

When the stoker bars and trunnion bars are assembled as shown in Fig. 1 each stoker bar is locked against displacement with respect to its related trunnion bar by the stoker bar next to the rear end while the rearmost stoker bar is locked against such displacement by the dump plate C, the latter being in turn locked against displacement with respect to its related trunnion bar by the rearmost stoker bar. This self locking status between the stoker bars is accomplished by normally disposing the arms 41 of the trunnion bars in upward inclination from the front to the rear of the furnace so that disengaging movement of any stoker bar with respect to its trunnion bar necessitates also a bodily rearward movement of the stoker bar and such bodily rearward movement cannot take place because of the intervention of the stoker bar next to the rear. In the case of the rearmost stoker bar the dump plate C intervenes to prevent such disengaging movement. This self locking action between the stoker bars is further intensified by providing each section of the stoker bars with a downwardly diverging portion 71 disposed between the groove 69 and the rear side of the stoker bar section and also by providing the fuel supporting end of the shield 66 with an enlargement 72.

The dump plates C are each shown as constructed of four sections 73 clamped together as a unit by tie rods 74 and 75. Each section 73 is provided with a shield portion 76 and side walls 77 through which the tie rods pass. The sections 73 have their side walls provided with trunnion bar receiving recesses 77' inclined upwardly, when assembled in the stoker, from the rear toward the front of the furnace, or in other words oppositely inclined with respect to the grooves 69 of the stoker bars. The trunnion bar of the dump plate of each grate unit is indicated at 78 and seats in the recesses 39 provided in the side and center bars of the supporting frame. The dump plate trunnion bars are provided with radial arms 80 which seat in the recesses 77' and thereby interlock the dumping plate and trunnion bar for unitary oscillation. The desired dumping movement of each dumping plate is accomplished through the medium of an operating bar 81 pivotally secured to the under side of the rear end of the plate and extended through the front wall of the furnace, the free end of the bar being provided with a gripping handle 82. It will be observed, by reference to Fig. 4, that in operating the dump plate the rear end moves down and the forward end moves up. This upward movement of the forward end crushes any clinker that may have formed so that it can readily drop into the ash pit.

I claim—

1. An integral combined stoker and grate bar for furnaces comprising a curved shield portion, spaced grate bars projecting at right angles from the convex face of the shield portion the full width of the latter, and a continuous bearing hub connecting the end portions of the grate bars, said grate bars being provided with trunnion bar receiving recesses extending into the bearing hub.

2. An integral combined stoker and grate bar for furnaces comprising a curved shield portion, spaced grate bars of substantially triangular shape projecting at right angles from the convex face of the shield portion the full width of the latter, and a continuous bearing hub mutually connecting the grate bars at their apexes, said grate bars being provided with trunnion bar receiving recesses extending into the bearing hub.

3. In a stoking grate, a supporting frame, a plurality of trunnion bars supported on the frame for oscillation, stoker bars separate from and removably supported on the trunnion bars for oscillation therewith, the line of movement of one terminal and each intermediate stoker bar in effecting removal thereof from their related trunnion bars being intersected by an adjacent stoker bar whereby each of said stoker bars is locked against displacement from its related trunnion bar, and removable means for locking the other terminal stoker bar against displacement from its related trunnion bar.

4. In a stoking grate, a supporting frame, a plurality of trunnion bars supported on the frame for oscillation, stoker bars separate from and removably supported on the trunnion bars for oscillation therewith, the line of movement of one terminal and each intermediate stoker bar in effecting removal thereof from their related trunnion bars being intersected by an adjacent stoker bar whereby each of said stoker bars is locked against displacement from its related trunnion bar, and an oscillatory dumping plate removable when operated to a predetermined position with respect to the frame and locked against removal in all other operative positions by the other terminal stoker bar, said dumping plate acting to lock the last named terminal stoker bar against displacement from its related trunnion bar.

5. In a stoking grate, a supporting frame, a plurality of trunnion bars supported on the frame for oscillation, stoker bars separate from and removably supported on the trunnion bars for oscillation therewith, one terminal and each intermediate stoker bar holding an adjacent stoker bar against displacement with respect to its related trunnion bar, and releasable means holding said terminal stoker bar against displacement with respect to its related trunnion bar.

6. In a stoking grate, a supporting frame, a plurality of trunnion bars supported on the frame for oscillation, stoker bars separate from and removably supported on the trunnion bars for oscillation therewith, and a removable oscillatory dumping plate supported by the frame, each stoker bar and the dumping plate having a forward enlargement extending over the adjacent end of the stoker bar in advance thereof, whereby all of the stoker bars are normally held against displacement with respect to their related trunnion bars.

In testimony whereof I hereunto affix my signature in the presence of two witnesses.

JOHN EDWARD REESE.

Witnesses:
O. A. WEHLE,
CATHERINE GILLIGAN.